July 17, 1934.  A. R. KADEL  1,966,799
MULTIPLE SECTION AGRICULTURAL IMPLEMENT
Filed Sept. 2, 1933   2 Sheets-Sheet 1
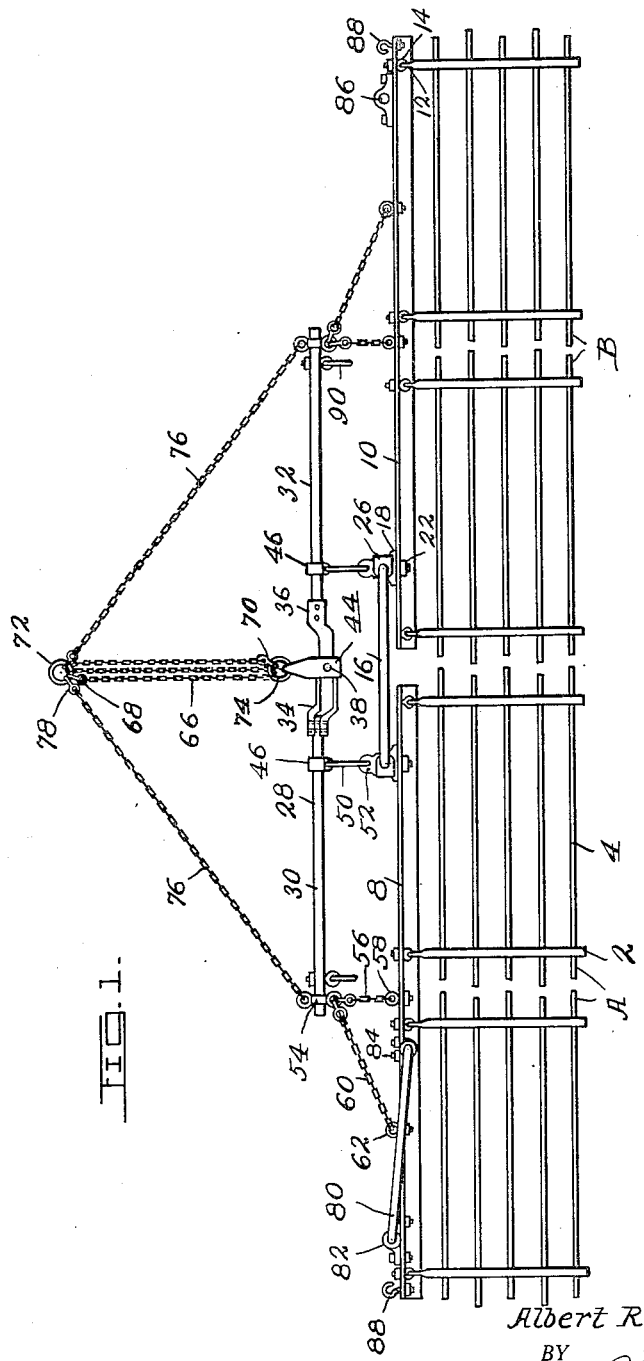
INVENTOR.
Albert R. Kadel,
BY
ATTORNEY.

July 17, 1934.  A. R. KADEL  1,966,799
MULTIPLE SECTION AGRICULTURAL IMPLEMENT
Filed Sept. 2, 1933   3 Sheets-Sheet 2
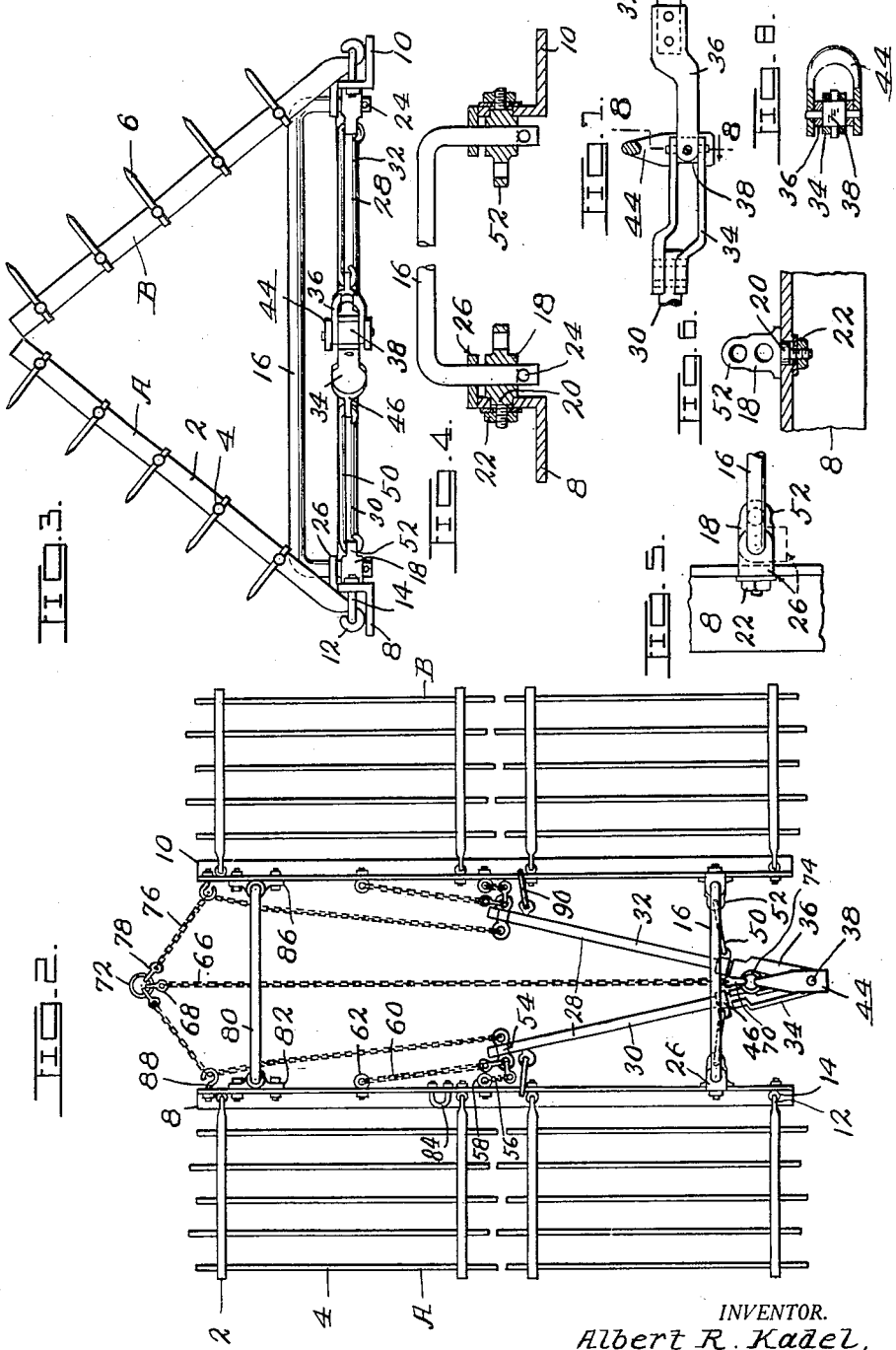
INVENTOR.
Albert R. Kadel,
BY
F. G. Fischer,
ATTORNEY.

Patented July 17, 1934

1,966,799

UNITED STATES PATENT OFFICE 1,966,799

MULTIPLE SECTION AGRICULTURAL IMPLEMENT

Albert R. Kadel, Victor, Kans.

Application September 2, 1933, Serial No. 687,973

19 Claims. (Cl. 55—84)

Multiple section agricultural implements such, for instance, as harrows are usually too wide to pass through the average farm gate without detaching or laboriously adjusting some of the parts to narrow up the implement.

It is therefore, the purpose of my invention to provide a multiple section implement in which the parts are so arranged that the major and hardest portion of the narrowing operation can be accomplished with the tractor, or other motive force employed in pulling the implement through the field, and thereby reduce to a minimum the manual labor required in carrying out the narrowing operation. The foregoing is also true when the implement is to be widened preparatory to operating in the field.

An important feature of the invention resides in certain elements which are operably connected to the sections and perform the dual function of draft appliances for the implement when extended for operation in the field, and act as runners upon which the sections may be folded and transported through gates, or from one field to another.

Another important feature resides in spacing means which unite the dual functioning elements and hold the same in spaced relation when acting either as draft appliances or as runners.

Other features will hereinafter appear and in order that the invention may be fully understood, reference will now be had to the accompanying drawings, in which:

Fig. 1 is a plan view of an agricultural implement in working position and embodying my invention.

Fig. 2 is a plan view of the implement partly folded.

Fig. 3 is an end elevation of the implement completely folded.

Fig. 4 is a detail elevation partly in section of a spacing element and associated parts.

Fig. 5 is a broken plan view of some of the parts disclosed by Fig. 4.

Fig. 6 is a plan view partly in section of the parts disclosed by Fig. 5.

Fig. 7 is a broken plan view partly in section of a draft appliance.

Fig. 8 is an enlarged vertical sectional view on line 8—8 of Fig. 7.

For the purpose of illustration I have shown the invention applied to a multiple section harrow, but it is to be understood that I do not wish to be restricted to this particular type of agricultural implement as it may be possible to apply my improvements to other multiple section implements. In the present instance I have shown the harrow comprising four sections, although this number may be reduced or enlarged so long as an even number of sections are employed, so that they may support each other when folded to the position disclosed by Fig. 3.

The sections shown are of a well-known type comprising longitudinal bars 2 and transverse bars 4, which latter are equipped with the usual harrow teeth 6. The sections are arranged in two groups A and B which have hinge-like connections with a pair of dual functioning elements 8 and 10 adapted to function as draft appliances for the respective groups when the sections thereof are arranged side by side for operation in the field, or said elements 8 and 10 may act as transport means for said groups when the sections are folded as shown by Fig. 3 to permit the harrow to readily pass through an ordinary farm gate. The connections between the harrow sections and the dual functioning elements are of such character as to permit the different parts to be arranged in the working position shown by Fig. 1 or be folded as above-mentioned. In the present instance I have shown such connections in the form of hooks 12 at the forward ends of the longitudinal bars 2, and eyebolts 14 connecting said hooks 12 to the respective dual functioning elements 8 and 10.

16 designates a spacing member for holding the elements 8 and 10 in spaced relation to each other. Said spacing member 16 is of inverted U-form with the vertical legs thereof extending freely through coupling members 18 having circular bosses 20 swiveled in the upwardly extending flanges of the elements 8 and 10, which latter are preferably of angle bar formation as best shown by Figs. 3 and 4. The bosses 20 are held in place by suitable means such as nuts 22.

When the implement is working in the field the elements 8 and 10 are free to follow undulations of the ground owing to their swivel connections with the bosses 20 and the freedom with which the coupling members 18 may move up and down on the vertical legs of the spacing member 16, such vertical movement being restricted only by pins 24 extending through the lower ends of said legs. However, when the implement is folded for transportation upon the elements 8 and 10 it is desirable to prevent the lower ends of the legs from dragging upon the ground, so I have provided said legs with supporting elements 26 which are freely mounted so that they may be turned to the position shown by Figs. 4 and 5 to engage over the upper portions of the respective elements 8 and 10. When thus turned the weight of the spacing member 16 cramps the supporting elements 26 and thereby causes them to grip and support said spacing member 16 in raised position as shown by Figs. 2, 3, 4 and 5. When the implement is ready for use in the field the supporting elements 26 are turned a quarter of a revolution, or from the full line to the dotted line position, Fig. 5, so as not to interfere with the independent vertical movement of the elements 8 and 10 upon the legs of the spacing member 16.

28 designates a foldable draft device comprising members 30 and 32, coupling members 34 and 36 rigidly connected to the members 30 and 32, respectively, and a universal joint 38 to which the coupling members 34 and 36 are operably connected. The universal joint permits the draft device 28 to be extended as shown by Fig. 1 or folded to the position disclosed by Fig. 2. The universal joint 38 also permits the draft device 28 to rock axially to a limited degree and thus accommodate itself to the pull exerted thereon at different angles by other draft appliances hereinafter described and part of which is attached to a clevis 44 mounted upon the universal joint.

The draft device 28 is equipped near its central portion with coupling elements 46 flexibly connected by rods 50 to eyes 52 on the forward ends of the coupling members 18. The draft device 28 is provided near its ends with coupling members 54 connected to the forward ends of short lengths of chain 56 which are attached at their rear ends to eye bolts 58 secured to the dual functioning elements 8 and 10. The coupling members 54 are also connected to the forward ends of short lengths of chain 60 which are connected at their ends to eyebolts 62 secured to the dual functioning elements 8 and 10.

66 designates a centrally disposed draft chain provided at its ends with hooks 68 and 70 detachably connected to draft rings 72 and 74, the former of which is adapted to be connected to a tractor or other motive force, not shown, while the ring 74 is connected to the clevis 44. A pair of draft chains 76 are also detachably connected to the ring 72 by hooks 78. The draft chains 76 diverge and are connected at their rear ends to the coupling members 54 to cooperate with the chains 76 in pulling the implement forward in the field.

80 designates a spacing member similar in form to the spacing member 16 and adapted to cooperate therewith in holding the elements 8 and 10 in parallelism after the implement has been adjusted to the positions shown by Figs. 2 and 3. One end of the spacing member 80 is permanently swiveled in a socket 82 and when not in use the opposite end of said spacing member 80 is removably connected to a U-bolt 84 which like the socket member 82 is carried by the member 8. After the harrow has been folded to the position shown by Fig. 2, the last-mentioned end of the spacing member 80 is lifted from the U-bolt and inserted in a socket 86 secured to the dual functioning element 10.

In practice the groups of sections A and B are disposed as in Fig. 1 for the purpose of harrowing a relatively wide strip during each passage of the harrow over a field. However, when it is desired to pass through the ordinary farm gate the hook 68 is disengaged from the ring 72 and sufficient slack is let out of the chain 66 to throw all of the strain upon the chains 76, whereupon the implement is again pulled forward until the chains 76 fold the draft device 28 and the groups A and B to the position shown by Fig. 2. During the foregoing operation the vertical legs of the spacing member 16 provide axes around which the outer ends of dual functioning elements 8 and 10 swing forwardly towards each other until said elements are in parallelism. The tractor is then stopped and the chains 76 are engaged over hooks 88 on the forward ends of the elements 8 and 10 which are then secured in spaced relation by disengaging the end of the spacing member 80 from the U-bolt 84 and engaging it with the hook 86. The forward ends of the members 30 and 32 of the draft device 28 are supported a short distance above the ground by hooks 90 connected to said members 30 and 32 and adapted to be engaged over the elements 8 and 10. The groups A and B of the sections are then swung upwardly on the elements 8 and 10 to the position shown by Fig. 3, after which the implement may be drawn through an ordinary farm gate.

From the foregoing description it is apparent that I have provided a foldable implement having the advantages above described, and while I have shown and described one form of my invention I reserve all rights to such other forms and modifications thereof as properly fall within the spirit and scope of the invention as claimed.

Having thus described my invention, what I claim and desire to secure by Letters Patent, is:

1. In combination with an agricultural implement having multiple sections adapted to operate side by side or be folded into compact form, duel functioning elements operably connected to said sections and adapted to function as draft appliances when the sections are arranged side by side, or function as transport means upon which said sections may be folded and conveyed from place to place.

2. In combination with an agricultural implement having multiple sections adapted to operate side by side or be folded into compact form, dual functioning elements operably connected to said sections being arranged to function as draft appliances when the sections are disposed side by side, or be arranged to function as transport means upon which said sections may be folded and conveyed from place to place, and means for arranging said elements to function as specified 3. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, and means for holding said elements in spaced relation to each other.

4. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place.

5. In combination with an agricultural implement having multiple sections arranged to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, and draft appliances for arranging said elements in position to function as specified.

6. In combination with an agricultural implement having multiple sections arranged to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, and means for holding said bars in spaced relation to each other when arranged to function as specified.

7. In combination with an agricultral implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, a spacing member for said elements, and coupling means operable connecting said spacing member to adjacent portions of said elements.

8. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, a spacing member for said elements provided with two vertical legs, and coupling members having swivel connections with said elements and said vertical legs and adapted for independent vertical movement upon the legs to permit independent vertical movement of said elements.

9. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, a spacing member for said elements provided with two vertical legs, coupling members having swivel connections with said elements and said vertical legs and adapted for independent vertical movement upon the legs to permit independent vertical movement of said elements, and draft appliances for arranging said elements in position to function as specified.

10. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, and a foldable draft device arranged in advance of and flexibly connected to said elements adapted when extended to hold said elements in position to function as draft appliances and when folded to arrange said elements in position to function as transport means.

11. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, a foldable draft device arranged in advance of and flexibly connected to said elements adapted when extended to hold said elements in position to function as draft appliances and when folded to arrange said elements in position to function as transport means, and a draft member connected to the intermediate portion of said draft device and adapted when drawn taut to hold the draft device extended and when relaxed to permit the draft device to be folded.

12. In combination with an agricultural implement having multiple sections adapted to operate side by side or be folded into compact form, dual functioning elements operably connected to said sections and adapted to function as draft appliances when the sections are arranged side by side, or function as transport means upon which said sections may be folded and conveyed from place to place, a foldable draft device arranged in advance of and flexibly connected to said elements adapted when extended to hold said elements in position to function as draft appliances and when folded to arrange said elements in position to function as transport means, a draft member connected to the intermediate portion of said draft device and adapted when drawn taut to hold the draft device extended and when relaxed to permit the draft device to be folded, and draft members for folding the draft device when the first-mentioned draft member is relaxed.

13. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners.

14. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners, and a draft member connected to the intermediate portion of said draft device and adapted when drawn taut to hold the draft device extended and when relaxed to permit the draft device to be folded.

15. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners, a draft member connected to the intermediate portion of said draft device and adapted when drawn taut to hold the draft device extended and when relaxed to permit the draft device to be folded, and draft members for folding the draft device when the first-mentioned draft member is relaxed.

16. In combination with an agricultural implement having multiple sections adapted to operate side by side or be folded into compact form, duel functioning elements operably connected to said sections and comprising two bars adapted to be arranged end to end to function as draft appliances when the sections are side by side, or be arranged in parallelism to function as runners upon which said sections may be folded and conveyed from place to place, a spacing member operably connected to the inner ends of said bars for holding the same in spaced relation when functioning as specified, and a second spacing member to coact with the first spacing member in holding the bars in parallelism.

17. In combination with an agricultural implement having mutiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners, a draft chain connected to the intermediate portion of said draft device and adapted when drawn taut to hold the draft device extended and when relaxed to permit the draft device to be folded, and draft chains connected to the outer ends of the draft device and adapted, when the first-mentioned draft chain is relaxed, to swing said outer ends forwardly and thereby swing the outer ends of the bars forwardly until said bars are in position to act as runners.

18. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners, a draft chain connected to the intermediate portion of said draft device and adapted when drawn taut to hold the draft device extended and when relaxed to permit the draft device to be folded, draft chains connected to the outer ends of the draft device and adapted, when the first-mentioned draft chain is relaxed, to swing said outer ends forwardly and thereby swing the outer ends of the bars forwardly until said bars are in position to act as runners, a spacing member providing axes around which the bars swing, and a second spacing member for coacting with the first one in holding the bars in parallelism.

19. In combination with an agricultural implement having multiple sections adapted to operate side by side or be folded into compact form, dual functioning elements operably connected to said sections and comprising two bars adapted to be arranged end to end to function as draft appliances when the sections are side by side, or be arranged in parallelism to function as runners upon which said sections may be folded and conveyed from place to place, a foldable draft device arranged in advance of and flexibly connected to said bars adapted when extended to hold said bars in position to function as draft appliances and when folded to arrange said bars in parallelism to act as runners, a draft chain connected to the intermediate portion of said draft device and adapted when drawn taut to hold the draft device extended and when relaxed to permit the draft device to be folded, draft chains connected to the outer ends of the draft device and adapted, when the first-mentioned draft chain is relaxed, to swing said outer ends forwardly and thereby swing the outer ends of the bars forwardly until said bars are in position to act as runners, a ring to which the forward ends of the chains are attached, a spacing member providing axes around which the bars swing, and a second spacing member for coacting with the first one in holding the bars in parallelism.

ALBERT R. KADEL.